United States Patent [19]

Tanaka

[11] Patent Number: 5,752,120
[45] Date of Patent: May 12, 1998

[54] MECHANISM FOR OPENING AND CLOSING A FILM CHAMBER OF A PHOTOGRAPHIC CAMERA

[75] Inventor: Yasuhiko Tanaka, Saitama-ken, Japan

[73] Assignee: Fuji Photo Optical Co., Ltd., Saitama-ken, Japan

[21] Appl. No.: 824,067

[22] Filed: Mar. 24, 1997

Related U.S. Application Data

[63] Continuation of Ser. No. 544,798, Oct. 18, 1995, abandoned.

[30] Foreign Application Priority Data

Oct. 20, 1994 [JP] Japan .................... 6-279768

[51] Int. Cl.$^6$ ..................... G03B 17/02
[52] U.S. Cl. ..................... 396/536; 396/538
[58] Field of Search ............... 396/439, 535, 396/536, 538

[56] References Cited

U.S. PATENT DOCUMENTS

| | | | |
|---|---|---|---|
| 4,870,437 | 9/1989 | Omaki et al. | 354/64 |
| 5,142,316 | 8/1992 | Tanii et al. | 354/288 |
| 5,258,793 | 11/1993 | Tsuji et al. | 354/288 |
| 5,432,575 | 7/1995 | Funahashi | 354/288 |
| 5,473,401 | 12/1995 | Tsunefuji | 354/288 |

*Primary Examiner*—Eddie C. Lee
*Attorney, Agent, or Firm*—Price, Heneveld, Cooper, Dewitt & Litton

[57] ABSTRACT

An opening/closing mechanism for a lid designed to be operated when it is desired to load or unload a cartridge or the like carrying a roll of film therein into or from a photographic camera of such a type that the cartridge or the like is loaded into or unloaded from the camera in a direction corresponding to an axis of the cartridge or the like or a spool thereof. This novel mechanism is constructed so that a lid locking member is kept in unmovable engagement with an opening/closing control member which is rotated under it's own gravity and thereby said lid locking member cannot be rotated without being disengaged from the opening/closing control member and the lid being in engagement therewith is reliably prevented from being unintentionally opened unless the camera is turned upside down. In this manner, this opening/closing mechanism reliably prevents the cartridge or the like from unexpectedly falling out from the camera during operation of film exchange. More specifically, the lid 2 is locked by a locking lever 10 which is, in turn, locked by a control lever 30. This control lever 30 is supported rotatably around a pivot pin 30a so as to be rotated under a gravity of a weight 31 attached to a forward end of the control lever 30 every time the camera 1 is turned upside down or vice versa. The control lever 30 is kept in engagement with the locking lever 10 and prevented from rotating around a pivot pin 10a therefore, from being disengaged from the lid 2 so long as the camera 1 stands upright, whereas the control lever 30 is disengaged from the locking lever 10 and allowed to rotate, i.e., the lid 2 is allowed to be opened as the camera 1 turned upside down.

15 Claims, 4 Drawing Sheets

MECHANISM FOR OPENING AND CLOSING A FILM CHAMBER OF A PHOTOGRAPHIC CAMERA

CROSS-REFERENCE TO RELATED CASE

This is a continuation of application Ser. No. 08/544,798 filed Oct. 18, 1995, now abandoned for a MECHANISM FOR OPENING AND CLOSING A FILM CHAMBER OF A PHOTOGRAPHIC CAMERA, now abandoned.

BACKGROUND OF THE INVENTION

1. Field of the Invention

The present invention relates to film chambers for photographic cameras and particularly to a mechanism for opening and closing a film chamber of the type wherein the film cartridge is loaded into or unloaded from the film chamber in a direction parallel to an axis of the film cartridge.

2. Description of the Related Art

Many photographic cameras use a roll film disposed within a so-called Patrone or cartridge. Once the Patrone or cartridge containing the film has been loaded into the camera, a built-in drive means, such as an electric motor, is actuated by a predetermined operation to advance the film by a leading end of the film which is pulled out from the Patrone or cartridge and wound around an advance spool so that a first film frame may be set adjacent an aperture. The drive means advances the leading end of the film onto the advance spool and automatically winds the advance spool, thus eliminating the troublesome operations of inserting the leading end of the film into the spool slit, engaging the film perforations with the sprocket teeth, etc., typically required for manually loading film. As a result, it is unnecessary to construct a camera body wherein the camera back must be fully openable.

Accordingly, for cameras of this type, it is well known to insert the Patrone or cartridge into the camera from a bottom of the camera body in a direction substantially corresponding to an axis of the Patrone or cartridge and to remove the Patrone or cartridge from the camera in the same manner after the roll of film has been exposed. An opening in the camera bottom allows the cartridge to be inserted and withdrawn. A lid is provided to close this opening. It is well known to turn the camera upside down and to open the lid in order to load or unload the film. While the camera is turned upside down in most cases at least for loading the film cartridge, there is an apprehension that the lid might open when the camera is set upright, resulting in an unwanted exposure of the film. Additionally, there is concern that if the lid opens with the camera upright, the cartridge may fall from the film chamber, resulting in damage or distortion of the cartridge which may also result in inadvertent exposure of the film. To avoid this, the inner surface of the film chamber is provided with elastic pressure means so that the side surface of the Patrone or cartridge bears against the pressure means and a frictional force generated therebetween serves to hold the Patrone or cartridge within the chamber. However, if the elasticity of the pressure means changes, retention of the Patrone or cartridge in the film chamber is not reliable and the cartridge could fall out. However, if too much pressure is exerted, it will be difficult to unload the cartridge, and an inexperienced user may try to shake the cartridge from the camera, resulting in possible damage to the cartridge as well as to the camera.

Additionally, the lead end of the film extending from the cartridge may obstruct smooth handling of the Patrone and embarrass the user. To relieve the user from such embarrassment, a cartridge has been proposed which does not have a leading end. Depending on the type of camera, such a cartridge may also be loaded or unloaded in the direction paralleling the axis of the cartridge. If the cartridge is elastically biased to prevent it from falling out, an inexperienced user may try to shake the cartridge out from the camera. In other words, there is always a concern that the proposed cartridge designed to overcome the abovementioned inconvenience for the user, might be ineffectively used by such user.

SUMMARY OF THE INVENTION

In view of the foregoing problems, it is a principal object of the invention to provide a mechanism for opening and closing a lid of a film chamber, to be operated when a Patrone or film cartridge is loaded or unloaded from a film chamber, wherein the lid mounted on a camera bottom cannot be opened unless the camera is set upright and no pressure member is provided in order to hold the Patrone or cartridge within the film chamber.

The object set forth above is achieved, according to one aspect of the invention, by a mechanism for a lid adapted to be operated when a roll of film is loaded into or unloaded from a photographic camera, functioning to open or close the lid over an opening formed in a bottom of the camera and dimensioned to allow a film cartridge to pass. When it is desired to load or unload the film into or from the camera through the opening in a direction generally corresponding to an axis of said casing, the opening/closing mechanism characterized in that the lid cannot be opened unless the camera is turned upside down.

The object set forth above is also achieved, according to another aspect of the invention, by an opening/closing mechanism for a lid configured to be operated when a roll film is loaded into or unloaded from a photographic camera, functioning to open or close the lid normally closing an opening formed in the bottom of the camera and dimensioned to allow a film casing to pass to or from the film chamber when it is desired to load or unload the film casing into or from the camera through the opening in a direction generally corresponding to an axis of the film casing; the opening/closing mechanism including a control knob adapted to selectively engage the lid and partially exposed externally of the camera, the control knob being operatively associated with a lid locking member movably supported so as to be moved away from the lid by operating the control knob; and an opening/closing control member movably supported to obstruct a movement of the lid locking member as it comes into engagement with the lid locking member and to allow movement of the lid locking member as it disengages the lid locking member; wherein the opening/ closing control member moves away from the rotatable zone of the lid locking member as the camera is turned upside down and thereby allows the lid locking member to be rotated; whereas the opening/closing control member moves into the rotatable zone as the camera is set upright and thereby obstructs a rotation of the lid locking member.

The object set forth above is also achieved, according to still another aspect of the invention, by an opening/closing mechanism for a lid configured to be operated when a roll of film is loaded into or unloaded from a photographic camera, functioning to open or close the lid with respect to an opening formed in the bottom of the camera, the opening dimensioned to permit a film casing to pass therethrough when it is desired to load or unload said film casing into or from the camera through the opening in a direction generally corresponding to an axis of the film casing, the opening/closing mechanism including a control knob adapted to be disengageably engaged with the lid and partially exposed externally of the camera, the control knob operatively associated with a lid locking member rotatably supported so as to be moved away from the lid by operating the control knob; and an opening/closing control member rotatably supported so as to be movable into or away from a rotatable zone of the lid locking member; wherein the opening/closing control member moves away from the rotatable zone of the lid locking member as the camera is turned upside down and thereby allows the lid locking member to be rotated; whereas the opening/closing member moves into the rotatable zone as the camera is set upright and thereby obstructs a rotation of the lid locking member.

The film casing may comprise a Patrone, canister, or cartridge adapted to leave a leading end of roll film carried therein exposed by the casing. Alternatively, the film casing may comprise a cartridge wherein no leading end of film is exposed externally of the casing.

According to yet another embodiment of the invention, and in order to provide a smooth operation of the opening/closing control member, a weight is attached to the opening/closing control member. Moreover, to ensure a reliable operation of the opening/closing member, a limiter means is provided, serving to limit the range of motion of the opening/closing control member. It is preferable for a user inexperienced in handling the camera to be able to achieve a smooth operation of the lid. To realize this, the lid is normally biased, by suitable biasing means, to be opened as the lid locking member is disengaged from the lid, and to ensure a reliable closure of the lid, as the lid locking member is normally biased, by suitable biasing means, to be engaged with the lid. Preferably, the lid locking member is provided as a part thereof with a latch means, and the camera body is provided at an appropriate position with latch receiving means so that the latch means and latch receiving means are engaged with each other as the lid is opened to prevent the lid locking member from being engaged with the opening/closing control member and the latch means and latch receiving means are disengaged from each other as the lid is closed.

With the camera constructed as described above, when the film casing is loaded or unloaded into or from camera, the lid for the film chamber cannot be opened unless the camera is turned upside down. For example, the mechanism of the invention may be arranged so that the lid cannot be opened unless the lid locking member engaging the lid is rotated away from this engagement with the lid; the opening/closing control member engaging with the lid locking member and the latter cannot be rotated unless the opening/closing control member is disengaged from the lid locking member; and the opening/closing control member is supported so as to be rotated away from engagement with the lid locking member under the effect of gravity as the camera is turned upside down. According to such arrangement, the opening/closing control member is moved away from the rotatable zone of the lid locking member as the camera is turned upside down and thereby the lid locking member is allowed to rotate out of engagement the lid whereupon the lid can be opened.

DETAILED DESCRIPTION OF THE EMBODIMENT

The opening/closing mechanism of the invention for the lid designed to be operated when a film canister is loaded into or unloaded from the camera will be more specifically described in reference with the presently preferred embodiment illustrated by the accompanying drawing.

Figure 4:
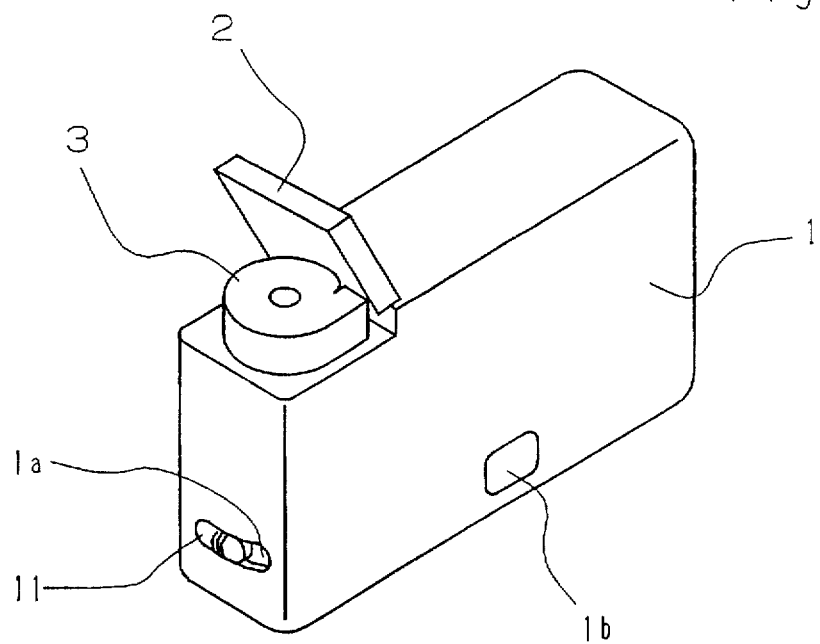
FIG. 4 is a simplified perspective view showing the camera provided with this opening/closing mechanism with the camera turned upside down and the lid opened.
Figure 5:
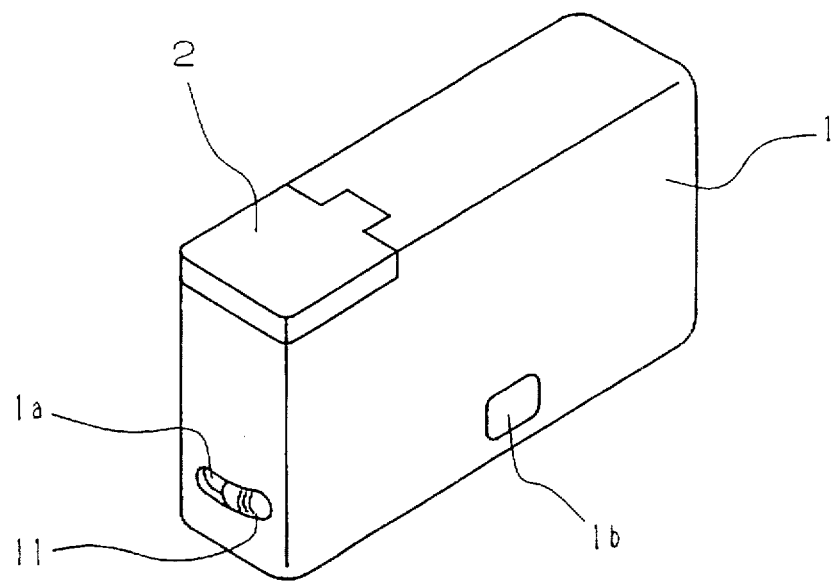
FIG. 5 is a view similar to FIG. 4 with the camera turned upside down and the lid closed.

FIGS. 4 and 5 are simplified perspective views showing a photographic camera 1 provided with a lid configured to be operated by the opening/closing mechanism of the invention for loading or unloading a roll of film into or from the camera with the latter upside down. FIG. 4 shows camera 1 with the lid 2 opened and ready for loading camera 1 with a cartridge 3 serving as a film casing. FIG. 5 shows camera 1 with lid 2 closed. Cartridge 3 contains therein a roll of film wherein a leading end is within cartridge 3. Cartridge 3 is loaded into camera 1 in a direction generally corresponding to an axis of cartridge 3. Specifically, camera 1 has an opening in the bottom allowing cartridge 3 to be loaded or unloaded, and a film chamber receiving cartridge 3 is concentrically arranged with the opening. Cartridge 3 is of a type such that the leading end of film also hides itself therein before it is actually used, so a cartridge spool on which the roll of film is wound is rotated to advance the film toward an advance spool for initial film advance.

Camera 1 is formed, in one of its longitudinally opposite sidewalls, with a circular-arc-shaped slit 1a through which a control knob 11 is exposed so that control knob 11 may be moved along slit 1a to open lid 2. Reference numeral 1b designates an ocular side window of a viewfinder.

Figure 1:
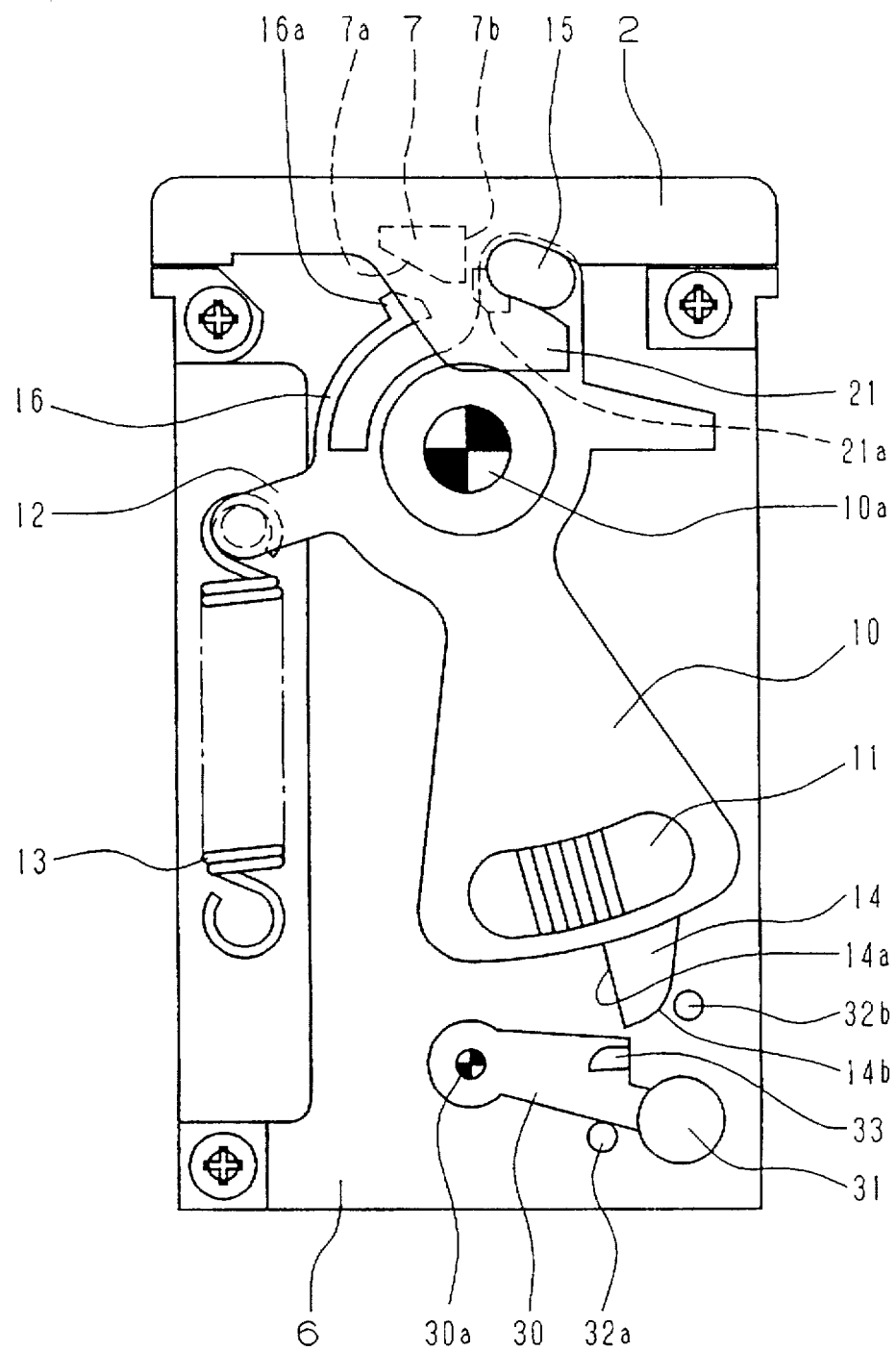
FIG. 1 is a side view showing one embodiment of an opening/closing mechanism embodying the invention with the camera turned upside down.
Figure 2:
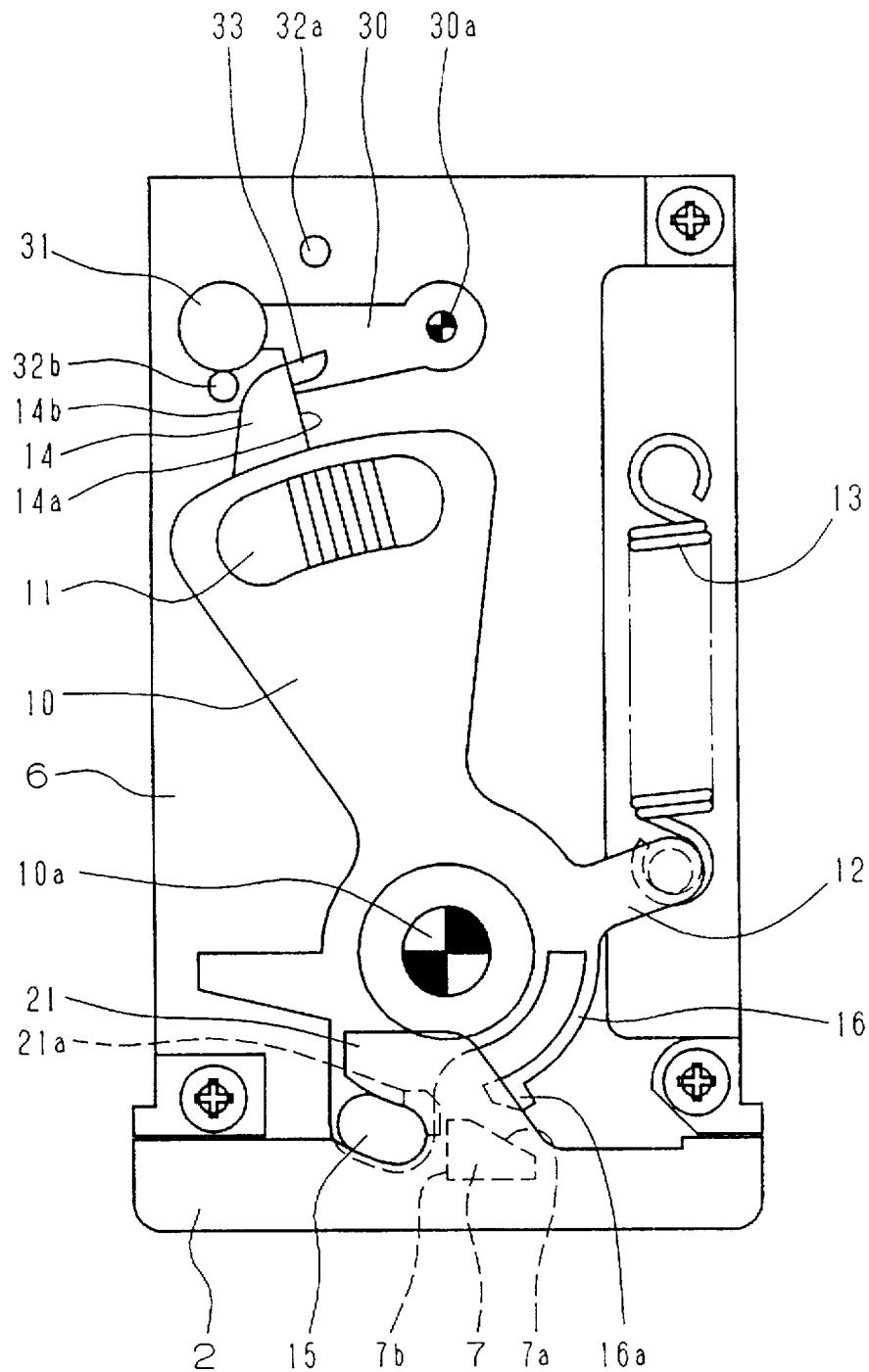
FIG. 2 is a view similar to FIG. 1 but showing this construction with the lid closed and the camera standing upright.
Figure 3:
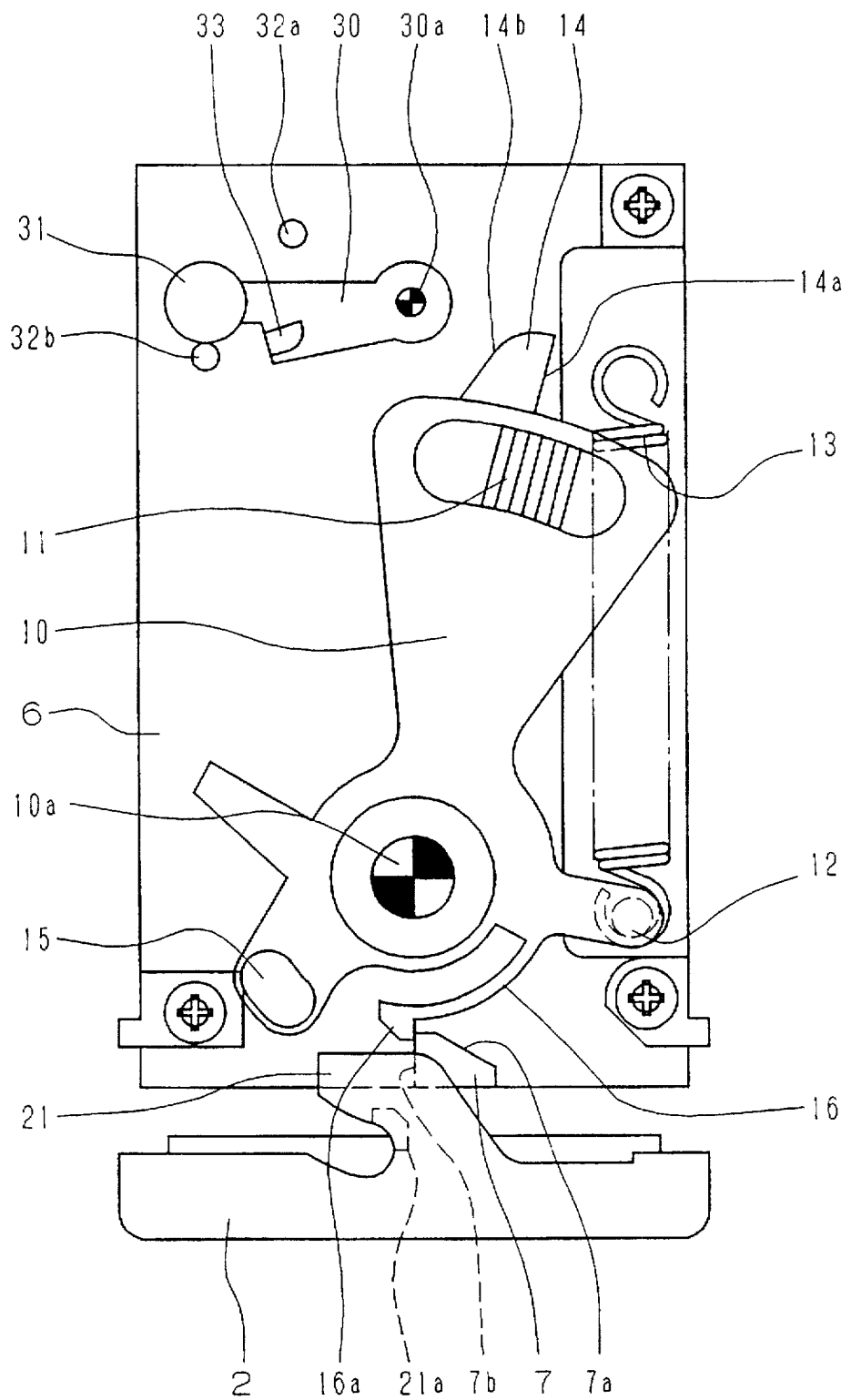
FIG. 3 is a view similar to FIG. 1 but showing this construction with the lid opened and the camera standing upright.

FIGS. 1-3 show the opening/closing mechanism of the invention in side view with camera 1 oriented upside down (FIG. 1) and with camera 1 standing upright (FIGS. 2, 3). Camera 1 is provided on the inner side of the sidewall with a base plate 6 on which the opening/closing mechanism is mounted and a locking lever 10, serving as a lid locking member, is supported on base plate 6 rotatably around a pivot pin 10a extending along a direction in which the film is transported. Locking lever 10 is formed at one of its transversely opposite sides with a spring anchoring arm 12 laterally projecting therefrom. A restoring spring 13 as biasing means comprising a tension coil spring is suspended between spring anchoring arm 12 and base plate 6. A restoring force of this restoring spring 13 biases locking lever 10, as will be described later, to be engaged with lid 2.

Locking lever 10 is formed, adjacent its upper end, with control knob 11 in a circular-arc-shape having a radial dimension substantially same as that of slit 1a and a circumferential dimension appropriately smaller than that of slit 1a. Control knob 11 projects out from locking lever 10 through slit 1a. Locking lever 10 is further formed, at its upper end, with an upwardly projecting stop lug 14. Stop lug 14 has transversely opposite side surfaces, one of which is defined by a plane radially extending with respect to pivot pin 10a of locking lever 10 as stop surface 14a, and has an uppermost end shaped in an appropriate circular arc to serving as flank 14b. Locking lever 10 is further formed at its lower part with locking pin 15 projecting therefrom toward the viewer of FIGS. 1–3. Spring anchoring arm 12 is formed with a latch arm 16 branching from a middle part of arm 12 downward in a circular arc defined around pivot pin 10a, and latch arm 16 is formed, in turn, at its lower end with a hook 16a projecting outward. Latch arm 16 is resilient and permitted to flex.

On the other hand, base plate 6 is provided, adjacent its lower end, with a stop pedestal 7 serving as a hook receiving means adapted to be engaged with hook 16a of latch arm 16 as locking lever 10 is rotated. Stop pedestal 7 is formed on its one side with a guide surface 7a defined by a slant or sloped plane, and on its other side with a stop surface 7b defined by a plane extending radially with respect to pivot pin 10a of locking lever 10. Hook 16a of latch arm 16 is configured so that its surface on the side of the latch arm's forward end is defined by a slant plane corresponding to previously mentioned guide surface 7a, and its surface on the side of the latch arm's base end is defined by a plane extending radially with respect to pivot pin 10a of locking lever 10.

Inner side of lid 2 is formed with a hook 21 adapted to be engaged with and disengaged from locking pin 15 as locking lever 10 is rotated, and hook 21 is formed, in turn, at its base end with a releasing projection 21a which, upon closure of lid 2, pushes hook 16a of latch arm 16 which has been in engagement with stop surface 7b of stop pedestal 7 to disengage hook 16a from stop pedestal 7.

A control lever 30 serving as a opening/closing control member is supported by an upper part of base plate 6 rotatably around a pivot pin 30a. Control lever 30 is provided at its forward end with a weight 31 of appropriate size or mass. Base plate 6 is further provided at an appropriate position with a pair of stopper pins 32a, 32b serving as limiting means planted thereon so that the side surfaces or weight 31 of control lever 30 may abut against stopper pins 32a, 32b and thereby a rotatable zone of control lever 30 is limited. Control lever 30 is formed at its lower part with a control projection 33 adapted to be moved into and from an extent within which stop lug 14 of locking lever 10 is rotatable.

The opening/closing mechanism for the lid designed to be operated when a roll of film is loaded into or unloaded from the camera operates as now described. As will be seen in FIG. 2, hook 21 formed on lid 2 engages locking pin 15 formed on locking lever 10 so long as the camera stands upright and lid 2 is closed, so there is little apprehension that lid 2 might be carelessly opened. Even if it is intended in this state to operate control knob 11 so that locking lever 10 may be rotated clockwise, as viewed in FIG. 2, locking lever 10 cannot be rotated, since stop lug 14 of locking lever 10 is in engagement with control projection 33 formed on control lever 30. More specifically, with camera 1 standing upright, control lever 30 abuts against lower stopper pin 32b under the gravity of weight 31, and control projection 33 moves into the rotatable zone of stop lug 14 until it comes in engagement with stop lug 14. Accordingly, lid 2 cannot be opened to load or unload cartridge 3 so long as camera 1 stands upright.

When camera 1 is turned upside down, control lever 30 is rotated clockwise from the position shown in FIG. 2 under the effect of gravity on weight 31 until it abuts against upper stopper pin 32a and, as a result, control projection 33 is retracted out from the rotatable zone of stop lug 14 (FIG. 1). In this state, locking lever 10 has returned to the position as shown in FIG. 1 under the restoring force of restoring spring 13. Control knob 11 may be moved clockwise from the position shown in FIG. 1, with the finger bulb or the like against control knob 11 to rotate locking lever 10 in a direction against the restoring force of restoring spring 13. This clockwise rotation of locking lever 10 causes locking pin 15 to disengage from hook 21 of lid 2, and lid 2 is unlocked. Lid 2 can now be opened and cartridge 3 can be loaded or unloaded. It should be understood that a torsion coil spring may be wound around a high pin of lid 2 in order to bias lid 2 open and thereby ensure that lid 2 may be at least partially opened as soon as locking lever 10 is disengaged from hook 21; lid 2 may then be easily opened.

When locking lever 10 is rotated clockwise from the position shown in FIG. 1, hook 16a of latch arm 16 abuts against guide surface 7a of stop pedestal 7, then guided by guide surface 7a makes latch arm 16 sufficiently yield that hook 16a rides across stop pedestal 7. Having ridden across stop pedestal 7, stop surface 7b of stop pedestal 7 engages with hook 16a, as shown in FIG. 3, and stop surface 7b is defined by the plane extending radially with respect to pivot pin 10a of locking lever 10, so hook 16a cannot be disengaged from stop pedestal 7 even under the restoring force of restoring spring 13 exerted on locking lever 10.

After cartridge 3 has been unloaded from the camera, lid 2 is closed. While it is preferred to close lid 2 with camera 1 turned upside down, it is also possible to close lid 2 with camera 1 standing upright so long as the falling of cartridge 3 from the chamber is carefully avoided. FIG. 3 shows a state in which lid 2 is to be closed with camera 1 standing upright. As lid 2 is closed, releasing projection 21a formed on the base end of hook 21 pushes up hook 16a in engagement with stop pedestal 7, thereby releasing hook 16a from engagement with stop pedestal 7. Upon disengagement of hook 16a from stop pedestal 7, locking lever 10 is rotated counterclockwise from the position shown in FIG. 3 under restoring force of restoring spring 13. When lid 2 has been moved to the position at which the lid is perfectly closed, locking pin 15 engages hook 21 of lid 2 and maintains lid 2 in such closed state. With camera 1 standing upright, control lever 30 abuts against lower stopper pin 32b under the effect of gravity on weight 31, and control projection 33 is moved forth into the rotatable zone of stop lug 14 formed on locking lever 10. However, when stop lug 14 abuts against control projection 33 in the course of the counterclockwise rotation of locking lever 10, the circular-arc-shaped flank 14b of stop lug 14 guides control projection 33 upward as stop lug 14 is rotated. Consequently, the control lever 30 is rotated clockwise, as viewed in FIG. 3, and control projection 33 is gradually moved away from the rotatable zone of stop lug 14. After stop lug 14 has passed through a region underlying control projection 33, control lever 30 is rotated under the effect of gravity on weight 31 until it abuts against lower stopper pin 32b and control projection 33 engages stop surface 14a of stop lug 14, as shown by FIG. 2. Stop surface 14a is defined by the plane extending radially with respect to pivot pin 10a of locking lever 10, so locking lever 10 cannot be further rotated clockwise from the position shown in FIG. 2.

While the invention has been described hereinabove in reference with the specific embodiment in which control lever 30 is provided with weight 31 attached thereto, weight 31 will become unnecessary when control lever 30 or control projection 33 is formed by material of an appropriate mass. In view of the fact that the side surfaces of control lever 30 as well as weight 31 abut against stopper pins 32a, 32b, respectively, every time camera 1 is turned upside down or stood upright, it is preferred, for example, to apply suitable shock absorbing material to stopper pins 32a, 32b and thereby to alleviate a collision noise.

While locking lever 10, serving as the lid locking member, and control lever 30, serving as the opening/closing control member, have been described and illustrated as they are rotatably supported on base plate 6, it is also possible to arrange them to be slidably supported. For example, in an alternative arrangement, on one hand, it is possible that the lid locking member can be slidably moved along an optical axis of a photographic lens so as to disengage this locking member from the lid by such slidable movement, and, on the other hand, the opening/closing control member can be slidably moved vertically of the camera under its own weight. With the camera in an upright position, the opening/closing control member is moved into a slidable zone of the lid locking member to obstruct further rotation of the lid locking member and thereby to prevent the lid from unintentionally opening. With the camera upside down, the opening/closing control member is moved away from the rotatable zone of the lid locking member, allowing this to be rotated and thereby allowing the lid to be opened. It is also possible, without departing from the scope and spirit of the invention, to provide an arrangement such that one of the lid locking member and the opening/closing control mechanism is slidably supported and the other is rotatably supported.

While the invention has been described on the assumption that the camera is of a type using cartridge 3 adapted for fully housing a roll of film therein, i.e., leaving no exposed leading end thereof, the inventive mechanism is applicable to cameras using so-called Patrone or cartridges adapted to leave a leading end of film normally projecting therefrom, so far as the camera is of such a type that the Patrone is loaded into and unloaded from the camera by loading and unloading the Patrone in a direction generally corresponding to an axis thereof, respectively. To ensure that the Patrone can be smoothly loaded without being obstructed by the leading end of the roll film, lid 2 is formed integrally with the camera back so that lid 2 may be sufficiently opened to let said leading end pass therethrough as the camera back is opened by a correspondingly appropriate angle.

As will be readily understood from the foregoing description, the inventive opening/closing mechanism for the lid designed to be operated when a roll of film is loaded into or unloaded from the camera effectively prevents the lid from being unintentionally opened and thereby prevents a film cartridge or the like from unintentionally falling out, since the lid cannot be opened unless the camera is turned upside down. The unloading operation also can be easily performed simply by covering the exposed opening after the lid has been opened with the palm of the user's hand and standing the camera upright so that the cartridge or the like may fall onto the palm of user's hand, since the invention advantageously makes any pressure member usually necessary to prevent the cartridge or the like from falling out unnecessary. In this manner, even the user inexperienced in handling the camera can easily handle the cartridge or the like.

What is claimed is:

1. A mechanism for preventing the unintentional opening of a lid on the bottom of a camera body, comprising in combination:

a locking member pivotally coupled at a first end to a wall of the camera body, a latch at said first end releasably engaging the lid, a lug extending from a second and opposite end of said locking member, and a control knob extending from said locking member through said wall of the camera body at a point intermediate said first and second ends for pivotally rotating said locking member and moving said latch with respect to the lid; and a control lever having first and second ends, said first end pivotally coupled to said wall of the camera body, said second end having a weight spaced from said first end sufficiently so that said control lever pivots under the influence of gravity when the camera body is inverted, and a projection intermediate said first and second ends, said projection configured to engage said lug on said locking member blocking pivotal rotation of said locking member about said first end of said locking member when the camera body is generally in an upright position, and said projection disengaging said lug on said locking member permitting pivotal rotation of said locking member when the camera body is generally in an upside down position.

2. The mechanism as defined in claim 1, further including at least one pin extending from said wall for limiting an angular arc of rotation of said control lever.

3. The mechanism as defined in claim 2, wherein said angular arc of rotation is less than about forty-five degrees.

4. The mechanism as defined in claim 1, wherein said projection includes a control projection extending in a direction perpendicular to said control lever.

5. The mechanism as defined in claim 1, wherein said locking member and said control lever are coplanar.

6. The mechanism as defined in claim 1, further including:

a stop surface defined on said lug for engaging said projection;

a resilient latch arm extending from said first end of said locking member for urging the lid open upon actuation of said locking member;

an anchoring arm extending from said first end of said locking member a spring having one end attached to said anchoring arm and an opposite end attached to the camera body for urging said locking member from a first position to a second position.

7. In a camera body having a lid closing a film chamber, a mechanism for preventing unintentional opening of the lid comprising in combination:

a locking lever pivotally coupled to a wall of the camera body and having a latch defined at one end for releasably engaging the lid in a closed position over the film chamber, a stop lug defined at an opposite end of the locking lever and a control knob extending from the locking lever and extending through said wall of the camera body for pivotally rotating said locking lever about the pivotal coupling such that the latch releases the lid;

a control lever having first and second ends, said first end pivotally coupled to said wall of said camera body and said second end spaced from said first end and a projection extending from said control lever intermediate said first and second ends:

at least one pin proximate said control lever restricting an angular arc of rotation of said control lever about said first end such that with the camera body generally in an upright orientation, said control lever pivots about said first end placing said projection adjacent said stop lug to block pivotal rotation of said locking lever, and with the camera body generally in an inverted orientation, said control lever pivots in an opposite direction about said first end moving said projection away from said stop lug to permit pivotal rotation of said locking lever:

a weight attached to said second end of said control lever;

a resilient spring arm extending from said first end of said locking lever urging the lid to an open position upon pivotal rotation of said locking lever, the spring arm extending from said first end of said locking lever:

a spring having a first end attached to the camera body and a second end attached to said spring arm said spring biasing said locking lever to a first position:

said stop lug including an arcuately shaped flank for engaging said projection and urging said locking lever in a direction away from said stop lug; and a shock absorbing material applied to and on at least one of said pin and said control lever for reducing collision noise.

8. A mechanism for opening and closing a lid on a bottom of a camera body, the lid configured to close an opening in the bottom of the camera body leading to a chamber dimensioned to receive a film cartridge therein, comprising in combination:

a locking member pivotally coupled proximate a first end to a wall of the camera body adjacent the chamber, said first end having a locking pin configured to releasably engage the lid in a closed position over the opening, a first arm extending from said first end for selectively engaging the lid, a spring arm extending from said first end, and a control knob extending from said locking member and through said wall of the camera body for access by a user to pivot said locking member between a first and second position, and a stop lug extending from said locking member;

a control member having first and a second ends and a projection extending therefrom at a point intermediate said first and second ends, said first end pivotally coupled to said wall of the camera body, and said second end weighted such that said second end of said control member pivots freely about said first end under the influence of gravity with the camera body in an upright position to block pivotal rotation of said locking member, and said second end pivots in an opposite direction about said first end with the camera body in an inverted position to permit pivotal rotation of said locking member;

a first pin proximate one side of said control member and a second pin proximate an opposite side of said control member for restricting angular rotation of said second end about said first end of said control member;

a shock absorbing material on said first and second pins for reducing noise produced by an impact of said control lever on said first and second pins; and a spring having one end attached to the camera body and a second end attached to said spring arm extending from said first end of said locking member for biasing said locking member toward a first position.

9. The mechanism as defined in claim 8, wherein said first arm extending from said first end of said locking member includes a resilient arcuate cantilevered arm having a first end configured to engage the lid and force the lid away from the opening in the bottom of the camera body upon rotation of said locking member, and a second end attached to said first end of said locking member.

10. The mechanism as defined in claim 9, wherein said stop lug includes an arcuate flank for urging said control member around said stop lug upon rotation of said locking member from said second position to said first position.

11. The mechanism as defined in claim 10, wherein said projection includes a control projection extending perpendicular from said projection and selectively engages said stop lug extending from said control member upon rotation of said control member.

12. The mechanism as defined in claim 11, wherein said control member is disposed proximate said second end of said locking member.

13. The mechanism as defined in claim 12, wherein said control member includes a weight at said second end of said control member for producing a moment arm in said control member.

14. The mechanism as defined in claim 13, wherein said locking member and said control member are coplanar.

15. A mechanism for selectively retaining a lid on a bottom of a camera body in a closed position, comprising in combination:

a locking member pivotally coupled proximate a first end to a wall of the camera body, said first end having a locking pin configured to releasably engage the lid in a closed position, a first arm extending from said first end for selectively engaging the lid, a spring arm extending from said first end, and a control knob extending from said locking member and through said wall of the camera body for access by a user to pivot said locking member between a first and second position, and a stop lug extending from said locking member;

a control member having first and a second ends and a projection extending therefrom at a point intermediate said first and second ends, said first end pivotally coupled to said wall of the camera body, and said second end weighted such that said second end of said control member pivots freely about said first end under the influence of gravity with the camera body in an upright position to block pivotal rotation of said locking member, and said second end pivots in an opposite direction about said first end with the camera body in an inverted position to permit pivotal rotation of said locking member, said control member being coplanar with said locking member; and a first pin proximate one side of said control member and a second pin proximate an opposite side of said control member for restricting rotation of said second end about said first end of said control member to an angular arc less than thirty degrees.

* * * * *